Oct. 9, 1951

C. W. HANSELL 2,571,031

RADIO CALLING SYSTEM

Filed Jan. 4, 1945

2 Sheets-Sheet 1

INVENTOR.
CLARENCE W. HANSELL.
BY H. S. Grover
ATTORNEY

INVENTOR.
CLARENCE W. HANSELL
BY
H. S. Grover
ATTORNEY

Patented Oct. 9, 1951 2,571,031

UNITED STATES PATENT OFFICE 2,571,031

RADIO CALLING SYSTEM

Clarence W. Hansell, Port Jefferson, N. Y., assignor to Radio Corporation of America, a corporation of Delaware Application January 4, 1945, Serial No. 571,223

2 Claims. (Cl. 250—2)

Figure 1:
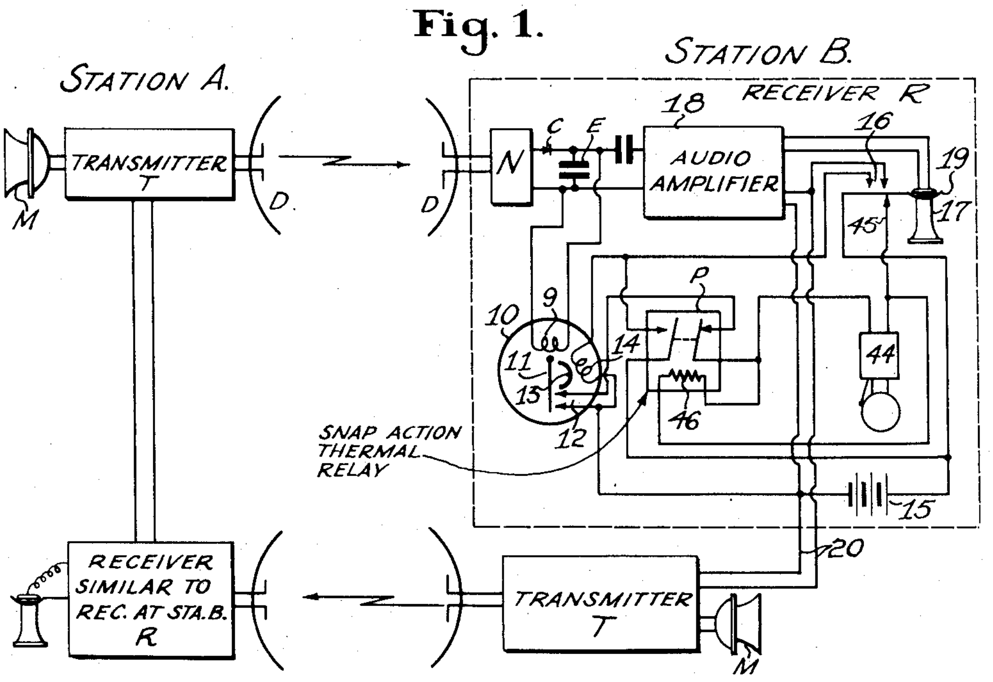

This invention relates to a radio calling or ringing system which requires no consumption of power at the receiver during standby or idle periods.

A great barrier to a more universal use of radio communication is the necessity to provide power to the receivers to keep them in condition to respond at all times to incoming calls. Even a very small amount of standby power, because it must be used continuously, soon uses up more energy than is required during actual use of the radio circuit and makes the use of batteries impractically expensive.

At the root of the problem has been the fact that, heretofore, there has not been available any means except vacuum tubes for converting high frequency power into direct current power when the amount of power to be converted is as small as that which can be utilized to give satisfactory communication through modern receivers. The crystal detector, or crystal rectifier, is the best known device for rectifying high frequency power, but as is known in the art, its ability to rectify approaches zero as the input power approaches zero. The reason the crystal detector functions satisfactorily as a heterodyne detector is because it is supplied with enough power from a local oscillator to make it sensitive to positive and negative increments of power superimposed on the local oscillator power by the small desired signal current which beats with it.

An object of the present invention is to provide a radio system in which the receiver is capable of converting radio frequency current into direct current without the aid of any vacuum tubes or other devices requiring the consumption of power during standby periods.

Another object is to enable a radio receiver to operate an indicator, such as an alarm or a bell, upon the receipt of incoming radio signals but without consuming power at the receiver during standby or idle periods.

A further object is to provide a radio receiver employing a crystal detector capable of operating a sensitive relay in response to pulsed radio frequency current applied to the crystal detector, and without the aid of devices requiring consumption of power.

A further object is to provide a radio communication system in which the transmitted energy is interrupted at a relatively very low audio or a sub-audible rate, and in which the receiver is provided with a crystal rectifier having in circuit therewith a relay responsive to the frequency of the interruptions of the transmitted energy, as a result of which the crystal rectifier converts the interrupted radio frequency energy into direct current capable of operating the relay without the aid of devices requiring the consumption of power.

A still further object is to provide a receiver employing a crystal detector for converting pulsed radio frequency current into direct current without the aid of any vacuum tube or other devices requiring the consumption of power, and a resonant electromagnetic relay responsive to the output of the crystal detector.

According to one embodiment of the invention, given by way of illustration only, there is provided a pulse type radio communication system having a radio transmitter which produces pulses modulated in accordance with the intelligence to be conveyed, and a radio receiver having a crystal rectifier capable of converting the pulsed radio frequency current into direct current without the aid of any vacuum tubes or devices requiring consumption of power. The pulses produced at the transmitter may be modulated in amplitude, timing or frequency. The transmitter output is further interrupted at a relatively low frequency, for example 20 cycles, to thereby produce low frequency rectified current in the output of the crystal rectifier at the receiver. The rectified current at the receiver is used to operate a sensitive relay which responds to the low frequency interruptions. This relay may or may not be a resonant reed type. The operation of the relay at the receiver closes certain contacts which, in turn, causes the operation of a visual or audible indicator to thereby call the attendant at the receiver. If desired, the operation of the relay may condition the receiver for actual reception. The attendant, upon answering the call, turns on the power at the receiver for receiving the intelligence. Where the system is designed for telephonic communication, the power at the receiver may be turned on automatically by lifting the telephone handset from its normal resting place.

In the practice of the present invention, it is preferred that both the transmitter and receiver be equipped with directive antennae pointed toward each other, and that the pulses transmitted from the transmitter have a peak power considerably higher than the average or steady state value. An advantage in the use of pulses for communication purposes is that a pulse transmitter increases the distance range over which the crystal receiver of the invention will function satisfactorily because of the fact that it is possible to increase the peak power of the transmitted pulses. Although the embodiment described above makes reference to the transmission of intelligence by means of pulses, it should be understood that the invention also contemplates continuous wave operation for communication purposes, and the use of interrupted waves for calling purposes.

A feature of one practical embodiment of the invention lies in the use of a very sensitive Weston type of relay for use in the output of the crystal rectifier at the receiver. This relay is provided with an operating winding through which the rectified current passes, and a needle and armature adapted to close a pair of contacts when drawn away from its normal position. A small permanent magnet takes over control of the movement of the needle after the needle has been started to move by the current through the relay winding, and this small magnet pulls the needle against the contacts to be closed. This type of relay is characterized by extreme sensitivity, large power handling ability (to wit, high amplification) and in accordance with the invention, an automatic electrical reset arrangement.

To increase the sensitivity of the relay, and particularly to overcome the effects of static friction, I contemplate making use of mechanical and electrical resonances in the relay and its circuits in a manner to provide for peak forces to overcome friction which are much greater than the available unidirectional steady state or average forces and which make it possible for the average unidirectional or average forces to do work in moving the armature and closing the relay contacts.

Another feature of one practical embodiment resides in the use of a resonant reed relay in the output circuit of the crystal rectifier at the receiver. This resonant relay is adjusted to respond to the desired frequency or interruption rate of the transmitted energy.

A further feature of the invention lies in the combination with the aforesaid very sensitive relay, of a snap action time delay relay for interrupting the audible indicator after a predetermined time interval, in the event the call is unanswered by the attendant at the receiver.

The invention has numerous applications, for example, in a two-way communication system, a radio relay system, a telephone exchange system for calling any one of a group of rural subscriber stations from a central office, etc. If the system is employed for calling over the radio equivalent of a party line rural telephone system, it is preferred that the relay in the output of the crystal rectifier at the rural receiver be a resonant reed type of relay, so that the different relays at the different rural stations can be made to be responsive to different interruption rates of the energy produced at the central office.

Figure 2:
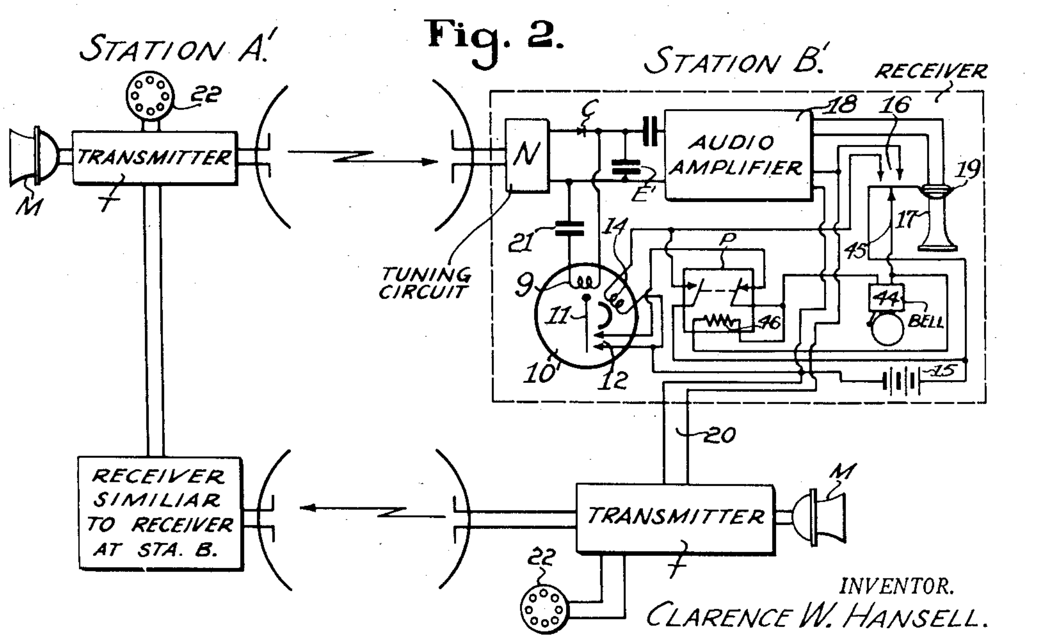
Figures 3, 4:
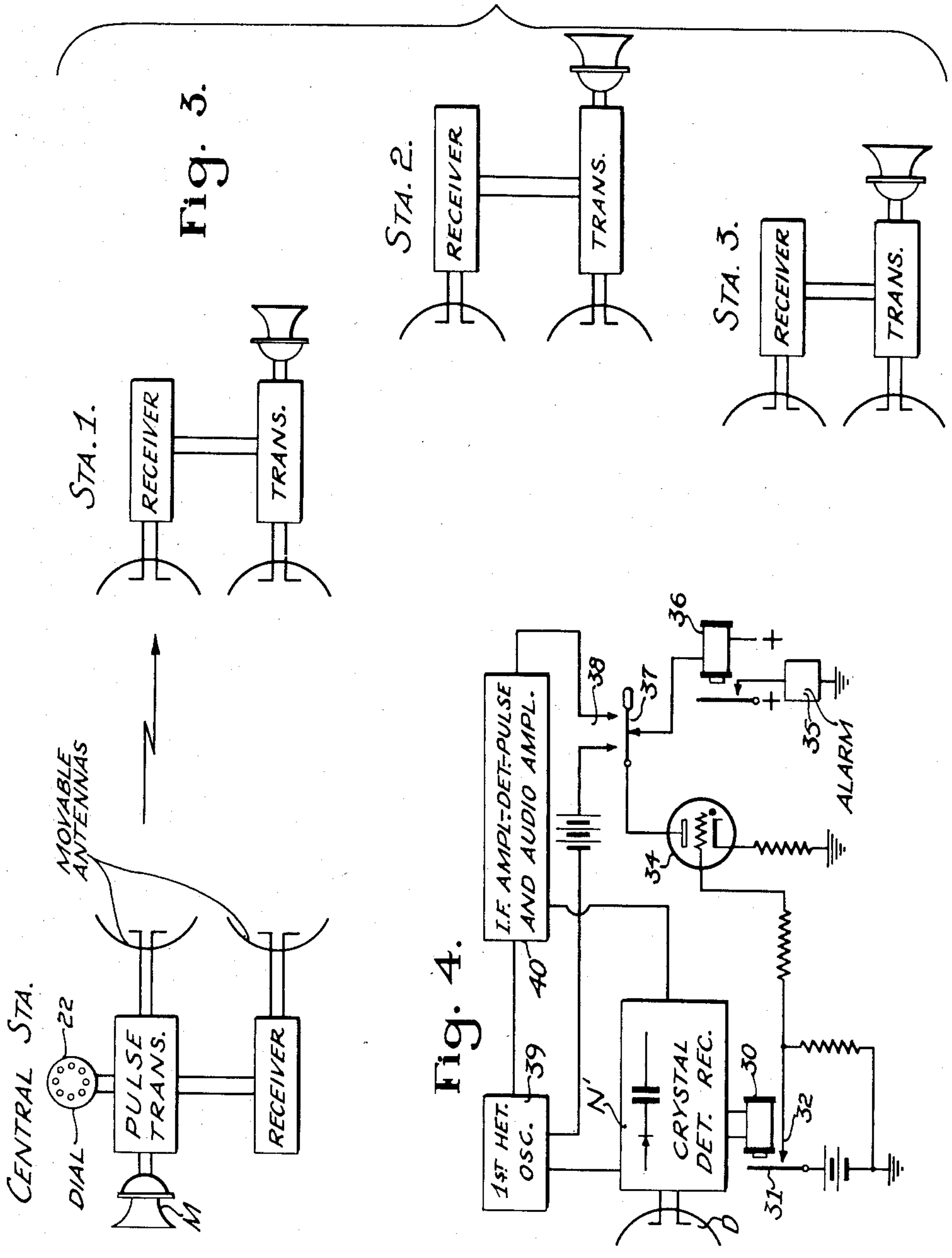

Other objects and features will appear from a reading of the following description, which is accompanied by a drawing, wherein:

Figs. 1, 2 and 3 diagrammatically show three different embodiments of the present invention, illustrating both the transmitter and the receiver, and Fig. 4 illustrates a receiver in accordance with the invention utilizing a resonant reed relay.

Referring to Fig. 1, there are shown two stations A and B similarly equipped and spaced apart for two-way radio communication. The receiver at station B is shown somewhat in detail within a box labeled R, and this receiver is similar in design to the receiver at station A which is merely shown in box form in the interest of simplifying the drawing.

The transmitter T at stations A and B of Fig. 1 comprises any well known type of continuous wave transmitter having suitable signal modulating means such as a microphone M, as shown. The output from the transmitter is coupled by way of a line TL to a suitable directive antenna D, here shown by way of example as a dipole located at the focus of a parabolic reflector.

The receiver R for each of these stations also includes a directive antenna D comprising a dipole at the focus of a parabolic reflector, this dipole being connected to a crystal rectifier or detector circuit comprising a crystal rectifier C, a network N for tuning the crystal and for matching the impedance of the crystal to the antenna, and also a condenser E for by-passing the radio frequency components appearing in the output of the crystal rectifier circuit. In shunt with the output of the crystal rectifier circuit, there is provided a coil winding 9 of an extremely sensitive relay 10, preferably of a type recently designed by the Weston Electrical Instrument Company.

Relay 10 may be of the type wherein a rotatable coil is mounted between the pole pieces of a substantially circular laminated permanent magnet similar in construction to sensitive electrical measuring instruments. Current through the coil winding is designed to move an armature or needle 11 for closing a pair of contacts 12. A small permanent magnet 13 functions to take over control of the movement of the needle 11 once it has been moved a moderate amount by current in the coil 9, and this small magnet 13 then pulls the needle the rest of the way against the contacts 12. The relay 10 is also provided with a reset coil 14 in accordance with the invention, which is in circuit with a battery 15 and a contact 16. This coil 14, when energized by the battery 15 upon lifting of the headphone 17, serves to automatically reset the needle 11 to its normal position, thus opening the contacts 12.

The contacts 12 are in circuit with a suitable alarm, such as a bell 44, to which is supplied energizing current from the battery 15 upon closure of the contacts 12 by the needle 11. The circuit to operate bell 44 may be traced from the negative terminal of battery 15, through both contacts 12, the right hand contacts of snap action time delay relay P, the winding of bell 44, lead 45, lower contact and metallic arm of hook 19 to the positive terminal of battery 15. Output from the crystal rectifier circuit is passed through an audio amplifier 18 and thence to the coil of the headphones 17 normally resting on a metallic hook 19 against pressure of a spring (not shown). Power for the audio amplifier 18, which may include suitable vacuum tube apparatus, and power for the reset coil 14 is normally removed from these circuit elements until such time as the headphone 17 is lifted from its hook 19 and causes an electrical connection to be made between the metallic hook 19 and the two contacts 16. Thus, during standby or idle periods, there is no consumption of power whatever in the receiver R.

In the operation of the system of Fig. 1, the antennas D, D at both transmitter and receiver are pointed toward each other so as to be most effective for communication purposes. By turning on the power in the transmitter T at station A, there will be radiated from station A continuous waves of sufficient power to cause the crystal rectifier at the receiver to convert the incoming high frequency power to direct current power. This power at the transmitter T can be turned on merely by lifting the headphone of the receiver at station A, so as to energize the transmitter in a manner similar to that shown at station B. The reception of high frequency energy at station B will cause a flow of direct current through the crystal rectifier circuit which will energize the coil 9 of the relay 10 and cause the needle 11 to move and close contacts 12 with the aid of the small permanent magnet 13. The directivity of the antennas at the transmitter and receiver and the tuning of the network N makes the receiver R reasonably selective. In this particular embodiment it is preferred that the relay 10 be damped, so that it does not operate upon the receipt of noise pulses of high frequency energy, such as might be produced by engine ignition systems, collected by the receiving antenna. The closure of contacts 12 will cause current from the battery 15 to flow through the bell 44 over an obvious circuit, thus creating an alarm to attract the attention of the attendant at station B.

When the attendant at station B removes the headphone 17 from the hook 19, a path will be closed to operate the reset coil 14 over contact 16 by means of battery 15, and simultaneously energy from the battery 15 will flow through contact 16 to the audio amplifier 18 to energize the vacuum tube apparatus therein. The operation of the reset coil 14 will restore the needle of the relay 10 to normal and shut off the alarm. In view of the fact that the transmitter T at station B is connected in shunt to the reset coil 14 by way of leads 20 and through contacts 16, it will be evident that the lifting of the headphone 17 will thus cause power to be transmitted over leads 20 to energize the vacuum tube apparatus at transmitter T. The crystal C and its network serves to convert the incoming energy to varying audio frequency energy which is amplified by apparatus 18 and heard in the headphone 17.

From what has been stated above, it will be noted that when the headphone 17 is on its hook, as shown, no power is supplied either to the audio amplifier 18 or to the transmitter T, and that there is therefore no consumption of power in either the transmitter, or the receiver R, until such time as the relay 10 operates to produce an alarm. Even when the alarm is produced, the only consumption of power is that utilized in operating the bell 44 by closure of contacts 12 by needle 11 until such time as the headphone 17 is removed from the hook by the attendant.

In the event that an incoming call may not be answered and it is desired to have the bell 44 cease ringing automatically after a time, the time delay relay marked P in Fig. 1, which may be a simple thermally operated snap switch, will serve to reset the relay 10 and to cut off current from the bell. Thermally operated devices suitable for the purpose are now articles of manufacture and are commonly called sign flashers. It should be noted that the heater 46 of the snap action time delay relay P is connected in shunt to the bell 44. The operation of relay P will now be described.

Received pulses, suitably interrupted to provide resonance operation of the calling relay, are rectified and the D.-C. current component, interrupted as the received pulses are interrupted, are used to operate the supersensitive relay 10. Relay 10 closes on an extremely small input energy and serves to energize the call bell 44 and the heater 45 of the snap action time delay relay P.

If the call is unanswered but calling continues, the time delay relay P by its operation periodically interrupts flow of current from battery 15 through the call bell and its own heater, thereby opening and resetting the supersensitive relay 10 by current through coil 14. The operation of relay P opens its right hand contacts, and closes its left hand contacts, thus opening the battery circuit to the bell and the heater and closing a battery circuit to the reset coil 14. After interrupting current in its own heater for a time, the time delay relay P snaps back to the calling position, the sensitive relay closes again and the bell rings again for a time, assuming, of course, that the calling continues. If desired, the thermal relay P may be designed and adjusted to cause interrupted ringing, so long as the incoming pulses persist, to simulate the ringing of ordinary central battery telephones.

If the call is unanswered, and the calling from the other station stops, the ringing of the bell will also stop, because sensitive relay 10 is automatically reset by the thermal time delay relay P and there is no rectified energy to close it again.

If the call is answered, the ringing of the bell is stopped automatically when the receiver is taken off the hook, and the sensitive relay is automatically reset.

The circuits are so arranged that the contacts 12 of the sensitive relay 10 close the bell circuit but are not required to interrupt the bell current. Other contacts, which are more easily made large and rugged, perform the interruption.

In view of the fact that the apparatus at station A is similar to that of station B, it will be clear that station A may be called or rung by station B in the same manner described above for calling station B from station A.

Fig. 2 is a modification of the system of Fig. 1 and differs therefrom essentially in the use of a dial 22 at the transmitter T for interrupting the transmission of the continuous waves at a low sub-audible frequency, for example 20 cycles, in order to call or ring the remote station. The stations in Fig. 2 are labeled A′ and B′. The transmitters T at both stations serve to radiate continuous waves when the headphone is removed from the hook. The relay 10′ and the receiver in each of the stations A′ and B′ is similar to the relay 10 of Fig. 1, except that the relay 10′ is undamped and made to be resonant either mechanically, electrically or both to the low sub-audible frequency transmitted by the remote transmitter. It should be noted that the coil winding 9 of the relay 10′ is coupled to the output of the crystal rectifier circuit of the receiver through a condenser 21. This condenser is a blocking condenser to prevent the flow of direct current through the winding 9 of the relay 10′. The advantage of this blocking condenser is that it prevents incoming noise from producing a direct current in the output of the rectifier which might otherwise operate the relay 10′.

In the operation of the system of Fig. 2, the transmitter T of station A′ is turned on by lifting the headphone thereat, thus causing power to energize the transmitter. This transmitter will radiate continuous waves which can be interrupted by the dial 22 at a sub-audible frequency to which the remote receiver relay 10′ is responsive. The receipt of the interrupted high frequency energy at the receiver will cause the crystal rectifier to pass pulses of energy of an amplitude and frequency such as to operate relay 10′ and cause closure of the contacts 12 by the needle 11. The relay 10′, by virtue of its resonant characteristic, will cumulatively respond to the interruptions of the incoming waves at the frequency to which the relay 10′ is responsive to cause the needle 11 to move so far as to cause the needle 11 to close the contacts 12. Except for this difference, the operation of the system of Fig. 2 is similar to that of the system of Fig. 1. Substantially the same circuit elements are employed in the systems of both figures and the same parts have been given the same reference numerals.

In order to increase the distance range of the receiver over which the crystal rectifier will function satisfactorily, it is preferred that the transmitter be of the pulse type which transmits modulated pulses of high frequency energy. By way of example only, the transmitter may send out pulses at the rate of 10,000 per second. One such arrangement is shown in Fig. 3, by way of example, in connection with a telephone receiving system having a central office and a multiplicity of remote rural stations 1, 2 and 3. All of these stations, it should be noted, employ directive antennas comprising a dipole located at the focus of a parabola. The pulse transmitter at the central office is provided with a dial 22 for interrupting the outgoing pulses at a low sub-audible rate, let us say of the order of 10 to 30 cycles per second, for the purpose of calling a particular station. The pulse transmitter at the central office is designed to send out a peak power considerably greater than the average or normal steady state value and may be of the type described in my copending application Ser. No. 497,315, filed August 4, 1943, which issued August 16, 1949, as Patent No. 2,478,920. In some installations, the antenna at this central office may be movable or rotatable so that it can be pointed most effectively toward a particular remote station 1, 2 or 3 with which it is desired to communicate at any one time to the exclusion of the other stations. Alternatively, the central station may employ as many antennas as needed to cover the necessary directions and these antennas may be coupled into the same, or separate receivers as required.

The apparatus at stations 1, 2 and 3 of Fig. 3 may be of the same general type as shown in detail in station B′ of Fig. 2, with the relay 10′ designed for alternating current operation by virtue of the use of the blocking condenser 21. This relay at each of the stations 1, 2 and 3 will be undamped and resonant to a particular frequency of interruption. Thus, a relay in the receiver of rural station 1 may be resonant to a frequency of interruption of 15 cycles per second, while the relay of the receiver of station 2 may be resonant to a different frequency of interruption of the transmitted power of, let us say, 20 cycles per second, and the relay at station 3 may have its relay resonant at still a different frequency of interruption of 30 cycles per second. By suitably choosing the dial interruption rate of the transmitter at the central office and turning the movable antenna to be most effective toward the particular station to be called, it is thus possible to ring a particular station 1, 2 or 3 without causing the operation of the relay 10′ at any of the other receiving stations. The stations 1, 2 and 3 may, in effect, be rural telephone subscribers.

As a refinement, to help overcome static friction in the relay, the moving element of the relay may be so designed as to be resonant within itself to the pulse rate of the transmitter or a multiple of it. By this means the bearings or pivots for the relay may be subjected to pulse frequency forces added to low frequency resonance, and/or D. C. forces to break the static friction and allow the relay to function on substantially less input power.

If the pulse transmitter of Fig. 3 transmits amplitude modulated pulses, then the condenser E′ appearing in the output of the crystal rectifier at the receiver, or some condenser later in the amplifier, should have such a value as to integrate the pulses. If the transmitted pulses, on the other hand are modulated in timing or if for any other reason the pulse wave forms are to be preserved, then condenser E′ should have such value as not to short-circuit the pulses in the output of the crystal. In this last case, it would be necessary to employ a pulse timing demodulator ahead of the audio amplifier 18. Such pulse timing demodulators have been developed and are becoming known in the art.

Where it is desired to use a pulse transmitter with only one other station for communication purposes, so as to provide two-way communication, the receivers at both stations may employ the resonant and undamped relay 10′ of Fig. 2 where interrupted calling is utilized, or may employ the relay 10 of Fig. 1 where direct current is utilized to operate the relay. In using direct current to operate the relay 10 in this last illustration, the relay 10 will be damped. Merely turning on the transmitter of the remote station to send out pulses of energy will, with certain designs and adjustments at the receiver, suffice to operate the relay at the remote receiver.

Where a pulse transmitter is employed, as for example in Fig. 3, or for any two-way communication in accordance with the invention, the transmitter may operate for example at 10,000 pulses per second for ordinary voice modulation frequencies, up to about 3000 cycles. The pulses would be at a peak power considerably greater than the average power. If desired, ordinary telegraph modulations, or teletype, or facsimile modulations, or the plain transfer of meter readings can be achieved by the present invention. For these last purposes, of course, the final receiving instrument must be modified to receive or record the particular type of modulation employed at the transmitter.

Fig. 4 shows how the invention can be used in connection with a mechanically resonant reed type of relay at a receiver. The system of Fig. 4 is designed to be used in connection with interrupted calling or ringing, the rate of interruption of the incoming radio waves corresponding to the resonant frequency of the mechanical resonant system. In Fig. 4, the incoming pulses are collected on directive antenna D and supplied to a crystal network N′ employing a frequency selective circuit, and a crystal rectifier in whose output there is provided a mechanically resonant relay 30. This resonant system is accurately tuned to the pulse interruptions so that a multiplicity of the pulses at the resonant frequency will cause the relay 30 to build up the amplitude of motion of the reed 31 to a maximum, at which time the reed 31 will engage the contact 32 and close a circuit to fire the gaseous tube 34. Tube 34 may be of the type known by the trade name "Thyratron." The number of impulses required to cause reed 31 to engage contact 32 will depend upon the Q of the mechanically resonant system, which is preferably large. The purpose of the mechanical resonant system is to prevent a single noise crash or two from causing actuation of the alarm 35. The operation of the gas tube 34 will energize the relay 36 through switch 37. The operation of relay 36 will operate the alarm 35 and thus attract the attention of the operator. The operator upon hearing or seeing the alarm 35, depending upon whether it is audible or visible, will operate switch 37 to open the anode path of the gas tube 34 and close contacts 38. The opening of the anode path for the gas tube 34 will extinguish the arc in the tube. The closure of contacts 38 will supply power to the first heterodyne oscillator 39 and to the intermediate frequency amplifier detector and pulse and audio amplifiers 40. The first heterodyne oscillator 39 is not essential in the practice of the invention, but is provided in order to increase the sensitivity of the system.

A common characteristic in all the embodiments described above is the fact that there is no consumption of power at the receiver during stand-by or idle periods, and that there is employed in the receiver a crystal rectifier circuit capable of converting radio frequency current into direct current without the aid of any vacuum tubes or other device requiring the consumption of power during stand-by periods. The sensitive relay in the output of the crystal rectifier, whether of the resonant reed type or otherwise, serves to create an alarm and attract the attention of the attendant.

What is claimed is:

1. A radio receiving system requiring no consumption of power during stand-by or idle periods and adapted to respond to pulses of radio frequency energy of peak power higher than the average power and interrupted at a comparatively low frequency rate, comprising a signal collector, a crystal detector coupled to said signal collector, a sensitive relay resonant at said low frequency and having an operating winding connected in the output of said crystal detector, said relay having an armature and a contact, and a magnet tending to pull said armature toward said contact, an alarm circuit coupled to said contact and adapted to be energized upon engagement of said armature and said contact, an audio frequency electron discharge device amplifier also coupled to the output of said crystal detector and adapted to be unenergized during stand-by periods, a signal utilization circuit coupled to the output of said amplifier, a switch having energizing contacts for supplying energy to said amplifier, the physical position of said utilization circuit controlling said switch, whereby movement of said utilization circuit causes said energizing contacts to close and energize said amplifier.

2. A radio receiving system requiring no consumption of power during stand-by or idle periods and adapted to respond to pulses of radio frequency energy of peak power higher than the average power and interrupted at a comparatively low frequency rate, comprising a signal collector, a crystal detector coupled to said signal collector, a sensitive relay resonant at said low frequency and having an operating winding connected in the output of said crystal detector, said relay having an armature and a contact, and a magnet tending to pull said armature toward said contact, an alarm circuit coupled to said contact and adapted to be energized upon engagement of said armature and said contact, an audio frequency electron discharge device amplifier also coupled to the output of said crystal detector and adapted to be unenergized during stand-by periods, a telephone receiver coupled to the output of said amplifier and adapted to rest on a switch arm, said switch arm having energizing contacts in association therewith for supplying energy to said amplifier, said contacts being normally disengaged when said telephone receiver rests on said arm, whereby the removal of said telephone receiver from said switch arm closes an electrical circuit between said contacts to thereby energize said audio amplifier.

CLARENCE W. HANSELL.

REFERENCES CITED

The following references are of record in the file of this patent:

UNITED STATES PATENTS

| Number | Name | Date |
|---|---|---|
| 950,781 | Hogan | Mar. 1, 1910 |
| 1,318,342 | Hammond | Oct. 7, 1919 |
| 1,522,581 | Espenschied | Jan. 13, 1925 |
| 1,555,893 | Thompson | Oct. 6, 1925 |
| 1,582,695 | Rosenbaum | Apr. 27, 1926 |
| 1,738,289 | Fletcher | Dec. 3, 1929 |
| 1,810,475 | Hansell | June 16, 1931 |
| 2,047,930 | Linder | July 14, 1936 |
| 2,064,961 | Tidd | Dec. 22, 1936 |
| 2,244,741 | Tovar | June 10, 1941 |
| 2,255,897 | Rebori et al. | Sept. 16, 1941 |
| 2,280,421 | Chappell | Apr. 21, 1942 |
| 2,369,783 | Homrighous | Feb. 20, 1945 |
| 2,425,614 | Goddard | Aug. 12, 1947 |

FOREIGN PATENTS

| Number | Country | Date |
|---|---|---|
| 216,651 | Great Britain | June 6, 1924 |
| 261,384 | Great Britain | Oct. 6, 1927 |
| 526,239 | Great Britain | Sept. 13, 1940 |